US012624960B2

(12) United States Patent
Hempel et al.

(10) Patent No.: US 12,624,960 B2
(45) Date of Patent: May 12, 2026

(54) DEVICE AND METHOD FOR DETERMINING MAP DATA ON THE BASIS OF OBSERVATIONS

(71) Applicant: Bayerische Motoren Werke Aktiengesellschaft, Munich (DE)

(72) Inventors: Wolfgang Hempel, Sinzing (DE); Martin Liebner, Munich (DE); Manuel Luitz, Munich (DE); David Pannen, Munich (DE); Fabian Zeller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 240 days.

(21) Appl. No.: 18/034,285

(22) PCT Filed: Oct. 22, 2021

(86) PCT No.: PCT/EP2021/079365
§ 371 (c)(1),
(2) Date: Apr. 27, 2023

(87) PCT Pub. No.: WO2022/090083
PCT Pub. Date: May 5, 2022

(65) Prior Publication Data
US 2023/0384115 A1      Nov. 30, 2023

(30) Foreign Application Priority Data

Oct. 28, 2020      (DE) ..................... 10 2020 128 391.1

(51) Int. Cl.
*G01C 21/00*      (2006.01)
*G01C 21/32*      (2006.01)
(Continued)

(52) U.S. Cl.
CPC .......... *G01C 21/3811* (2020.08); *G01C 21/32* (2013.01); *G01C 21/3837* (2020.08); *G06F 18/23* (2023.01); *G06T 7/579* (2017.01)

(58) Field of Classification Search
None
See application file for complete search history.

(56) References Cited

U.S. PATENT DOCUMENTS 10,598,489 B2      3/2020 Zhang et al.
2008/0016063 A1*      1/2008 Fuerst .............. G06F 16/24556
(Continued)

FOREIGN PATENT DOCUMENTS

DE      10 2018 210 677 A1      1/2020

OTHER PUBLICATIONS

International Search Report (PCT/ISA/210) issued in PCT Application No. PCT/EP2021/079365 dated Feb. 10, 2022 with English translation (six (6) pages).
(Continued)

*Primary Examiner* — Hongye Liang
(74) *Attorney, Agent, or Firm* — Crowell & Moring LLP

(57) ABSTRACT

A device for determining map data with respect to a route portion, configured to acquire a first set of first observations during a first trip along the route portion and a second set of second observations during a second trip along the route portion, determine values of a measure of similarity for different possible observation pairs each consisting of one first observation and one second observation, determine, on the basis of the values of the measure of similarity for different possible observation pairs, an overall association with one or more one-to-one associations between, in each case, one first observation from the first set and one second observation from the second set. The device is also config-
(Continued)

ured to determine the map data with respect to the route portion on the basis of the overall association.

18 Claims, 5 Drawing Sheets

(51) Int. Cl.
    *G06F 18/23*    (2023.01)
    *G06T 7/579*    (2017.01)

(56)             References Cited

U.S. PATENT DOCUMENTS

| | | | |
|---|---|---|---|
| 2018/0189601 A1* | 7/2018 | Dabeer | ................ G06V 20/588 |
| 2019/0325235 A1 | 10/2019 | Stenneth et al. | |
| 2020/0109954 A1 | 4/2020 | Li et al. | |
| 2020/0201891 A1 | 6/2020 | Viswanathan | |

OTHER PUBLICATIONS

German-language Written Opinion (PCT/ISA/237) issued in PCT Application No. PCT/EP2021/079365 dated Feb. 10, 2022 (nine (9) pages).

German-language Search Report issued in German Application No. 10 2020 128 391.1 dated Jul. 1, 2021 with partial English translation (12 pages).

Jensen et al., "Vision for Looking at Traffic Lights: Issues, Survey, and Perspectives", IEEE Transactions on Intelligent Transportation Systems, Jul. 2016, pp. 1800-1815, vol. 17, No. 7, XP011615293, (16 pages).

Yoneda et al., "Robust Traffic Light and Arrow Detection Using Digital Map with Spatial Prior Information for Automated Driving", Sensors, Feb. 21, 2020, pp. 1-24, vol. 20, No. 1181, XP055884218, (24 pages).

Chipka et al., "Estimation and Navigation Methods with Limited Information for Autonomous Urban Driving", Engineering Reports, Oct. 17, 2019, pp. 1-26, XP055884220, (26 pages).

* cited by examiner

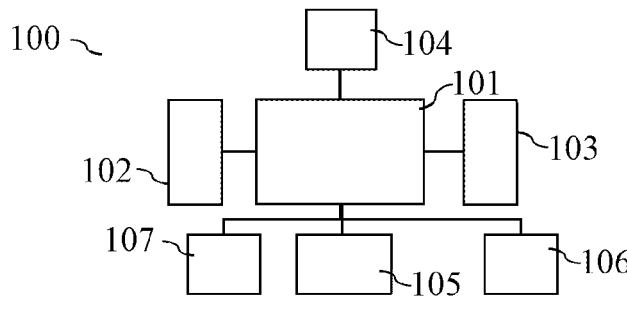
Fig. 1
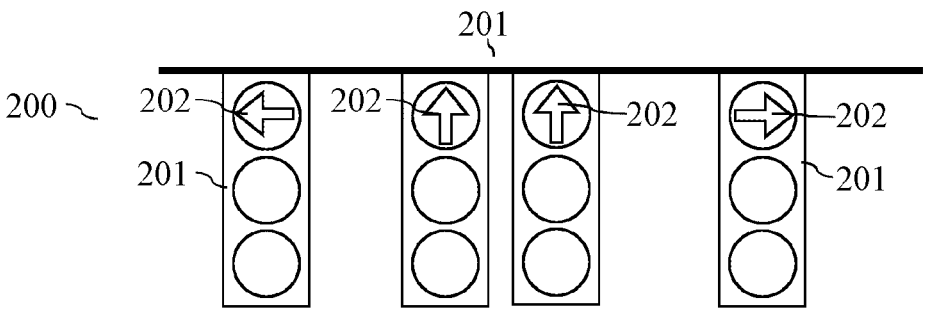
Fig. 2a
Fig. 2b

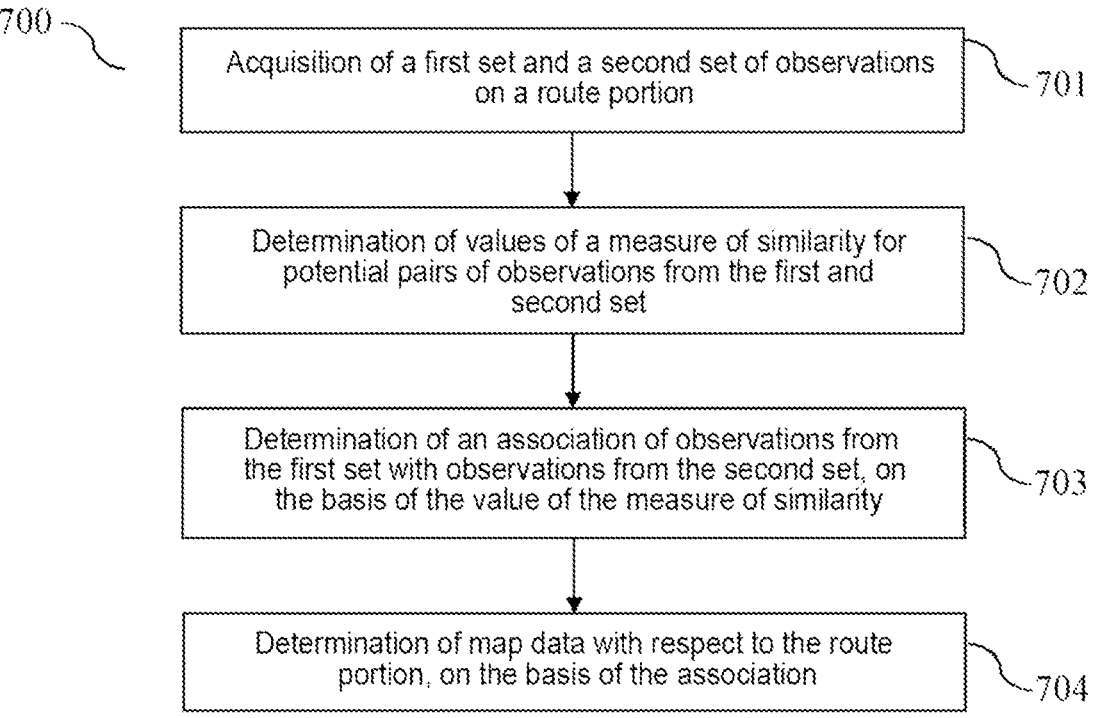

700

Acquisition of a first set and a second set of observations on a route portion — 701

Determination of values of a measure of similarity for potential pairs of observations from the first and second set — 702

Determination of an association of observations from the first set with observations from the second set, on the basis of the value of the measure of similarity — 703

Determination of map data with respect to the route portion, on the basis of the association — 704

Fig. 7

DEVICE AND METHOD FOR DETERMINING MAP DATA ON THE BASIS OF OBSERVATIONS

FIELD

The invention relates to a device and a corresponding method for determining map data with respect to a roadway, carriageway or route portion, particularly with respect to a node point. Map data can be determined on the basis of observations of landmarks.

BACKGROUND AND SUMMARY

A vehicle can comprise one or more driving functions which support the guidance of the vehicle by the driver, particularly longitudinal guidance and/or lateral guidance. An exemplary driving function for supporting the longitudinal guidance of a vehicle is an Adaptive Cruise Control (ACC) function, which can be employed for the longitudinal guidance of the vehicle at a stipulated set speed or target speed and/or with a stipulated target clearance from the vehicle which is driving ahead of the vehicle. The driving function can also be employed at a signaling unit (particularly at a traffic light) situated at a traffic node point (for example, at an intersection), in order to execute automated longitudinal guidance, for example an automatic delay, at the signaling unit.

Consideration of a signaling unit at a node point (wherein the signaling unit comprises one or more signal generators) can be executed by reference to map data, wherein map data comprises one or more mapping attributes with respect to a landmark which is to be considered, for example a signaling unit. The quality of the driving function is thus typically dependent upon the quality of map data available, and particularly upon the quality of available mapping attributes.

The present document particularly addresses the technical object of the improvement of map data with respect to a route portion, particularly with respect to a node point having at least one signaling unit, in order to improve the convenience and/or safety of a driving function, particularly a driving function for automated longitudinal guidance at a signaling unit or node point.

This object is fulfilled in accordance with the present disclosure. Advantageous embodiments are also described in the present disclosure. It should be observed that additional features of a patent claim which is dependent upon an independent patent claim, in the absence of the features of the independent patent claim or in combination with only a proportion of the features of the independent patent claim, can form a separate invention which is independent of the combination of all the features of the independent patent claim, and which can be the subject matter of an independent claim, a divisional application or a subsequent application. The same applies correspondingly to the technical instruction described in the description, which can form an invention which is independent of the features of the independent patent claims.

According to one aspect, a device is described for determining map data with respect to a route portion, particularly with respect to a node point. Map data can thus be determined which identify attributes with respect to one or more landmarks in the route portion. Exemplary landmarks include a signal generator of a light signal installation, a lane marking, a traffic sign, a reflector post or pole, etc. Exemplary attributes of a landmark include the position of the landmark, the landmark type of the landmark (e.g. signal generator, traffic sign, post, etc.), etc.

The device can be designed to acquire a first set of first observations during a first trip along the route portion, and a second set of second observations during a second trip along the route portion. In particular, the device can be designed to acquire a plurality of sets, each comprising one or more observations, for a corresponding plurality of trips along the route portion.

An observation of a landmark can indicate the (measured or estimated) position and/or the (measured or estimated) type of the landmark. An observation can have been acquired on the basis of sensor data from at least one sensor, particularly an environment sensor and/or a position sensor, of a vehicle during a trip along the route portion.

Thus, during different trips, respectively detected sets of one or more observations of landmarks can be determined. Sets of one or more observations can be delivered by one or more different vehicles, e.g. by transmission via a communication link. Different sets of observations can differ from each other, particularly on the grounds of offset errors between the different sets of observations. Moreover, a set of observations can potentially include multiple observations of the same landmark (e.g. on the grounds of intermittent coverage of the landmark during a trip along the route portion). As described hereinafter, by means of the measures described in the present document, multi-trip observations of the same landmark can be detected in a reliable manner.

The device can be designed to employ the internal geometry of the route portion as a means of assigning observations from different sets of observations to one another, or for the mutual association thereof. In particular, consideration can be given to the fact that, although different sets of observations can comprise a systematic offset with respect to one another, observations within a single set, on the grounds of the stationary arrangement of landmarks, can be expected to assume a relatively similar arrangement with respect to one another, even in different sets.

The device can be designed to determine values of a measure of similarity for different possible observation pairs, each consisting of a first observation (from the first set) and a second observation (from the second set).

The measure of similarity for a potential observation pair comprised of a specified first observation and a specified second observation can thus indicate the similarity between the arrangement of one or more (in particular, of all) adjacent observations from the first set relative to the specified first observation, and the arrangement of one or more (in particular, of all) adjacent observations from the second set relative to the specified second observation.

Values of a measure of similarity for different potential observation pairs (in particular, for all potential observation pairs) can thus be determined. The first set can comprise e.g. Q first observations (e.g. Q>2 or Q>3) and the second set can comprise e.g. R second observations (e.g. R>2 or R>3). Q×R potential observation pairs can thus be formed. For each potential observation pair, the value of the measure of similarity can be determined, e.g. a value between 0 and 1 in each case. A rising value in the measure of similarity can thus indicate a rising similarity of observations.

The device can further be designed, on the basis of values for the measure of similarity of different potential observation pairs, to determine an overall association comprising one or more one-to-one associations between, in each case, one first observation from the first set and one second observation from the second set. An overall association of the first observations with the second observations can thus be determined. Optionally, each first or each second observation can be assigned a maximum of once only, in each case. Optionally, and alternatively, it can also be permitted that an observation from the first set is assigned to a plurality of (relatively closely mutually arranged) observations from the second set.

The overall association can be determined in accordance with values for the measure of similarity such that, for the overall association, an overall value of the measure of similarity, which is dependent upon values of the measure of similarity for observation pairs in the overall association, is optimized and, in particular, is maximized. In particular, the overall association can be selected from a set of potential overall associations which comprises the highest overall value of individual values of the measure of similarity for observation pairs (i.e. for one-to-one associations) in the overall association.

Map data with respect to the route portion can then be determined on the basis of the overall association. In particular, the device can be designed to determined map data with respect to the route portion by means of a SLAM (Simultaneous Localization and Mapping) method, on the basis of the overall association. In particular, one-to-one associations or observation pairs thus determined can be considered in the context of the SLAM method.

Exemplary SLAM methods include EKF (Extended Kalman Filter)—SLAM, FastSLAM, GraphSLAM, etc. In the context of the GraphSLAM method (which can be employed in a particularly advantageous manner in conjunction with the measures described in the present document), available information on vehicle poses, observations and/or landmarks is encoded in information graphs or factor graphs by means of "factors". These factors (observations, odometry, GPS, etc.) represent soft constraints or conditions in force between variables (vehicle poses, landmark positions, etc.). These variables can then be optimized such that constraints, in their totality, are infringed to the least possible extent. For the introduction of constraints, the overall association determined between observations with respect to one another (and, optionally, with respect to the various landmark entities) can be employed. In particular, associations with landmark entities can be determined in the clustering step, which is described hereinafter, wherein closely adjacent observations are assigned to the same cluster, and thus to the same landmark or the same landmark entity.

By the consideration of an overall association which is determined on the basis of the similarity of different sets of observations, map data for a route portion, particularly for a node point, can be determined with a high degree of accuracy and reliability. This applies particularly to intersections, which typically comprise a particularly structured arrangement of landmarks (particularly signal generators).

The device can be designed to determine a set of first translation vectors of the specified first observation vis-à-vis the one or more adjacent observations from the first set. A first translation vector for a specified first observation from the first set can thus connect the specified first observation to the specified adjacent observation. This first translation vector can then describe how the specified adjacent observation is arranged relative to the specified first observation.

In a corresponding manner, the device can be designed to determine a set of second translation vectors of the specified second observation vis-à-vis the one or more adjacent observations from the second set. The individual second translation vectors describe the relative arrangement of the respective adjacent observation vis-à-vis the specified second observation.

The device can particularly be designed, for each of the Q first observations, to determine a respective set of Q−1 first translation vectors vis-à-vis the respective Q−1 adjacent observations from the first set. Moreover, the device can be designed, for each of the R second observations, to determine a respective set of R−1 second translation vectors vis-à-vis the respective R−1 observations from the second set.

The value of the measure of similarity for a potential observation pair can then be determined in an accurate and robust manner on the basis of the set of first translation vectors and on the basis of the set of second translation vectors for this observation pair. Optionally, it can occur that only a proportion of the set of first translation vectors and/or only a proportion of the set of second translation vectors are employed for determining the value of the measure of similarity. Optionally, all the translation vectors of at least one set can be considered.

The device can particularly be designed (particularly for a specified potential observation pair) to determine a vector similarity of vector pairs from a first translation vector and a second translation vector respectively. In particular, the vector similarity can describe the similarity of the spatial location (e.g. the angle) and/or of the length (e.g. the magnitude) of the two translation vectors. In this connection, optionally, a uniform (mean) rotation between the set of first translation vectors and the set of second translation vectors can also be considered. A check can thus be executed of the similarity of the orientation of translation vectors for the specified potential observation pair.

The value of the measure of similarity for the specified potential observation pair can then be determined in a particularly accurate manner on the basis of the vector similarity of the one or more vector pairs.

The device can particularly be designed, for a specified potential observation pair comprising a specified first observation and a specified second observation, to determine an (overall) vector similarity between the set of first translation vectors for the specified first observation and the set of second translation vectors for the specified second observation. The value of the measure of similarity for the specified potential observation pair can then be determined in a particularly accurate manner on the basis of the (overall) vector similarity thus determined.

The device can be designed e.g. for the determination of the (overall) vector similarity for a specified potential observation pair, for each potential combination of a first translation vector from the set of first translation vectors and a second translation vector from the set of second translation vectors, to determine an individual value of the vector similarity between the respective first translation vector and the respective second translation vector in each case. The individual value of vector similarity can indicate the similarity of orientation and/or the similarity in length of the two translation vectors. Later in the present document, an exemplary formula is provided for determining the individual value of vector similarity between two translation vectors.

On the basis of individual values for vector similarity, a set of one or more one-to-one vector associations can be established between a respective first translation vector and a respective second translation vector, for which an overall value of vector similarity is increased, and particularly is maximized. In other words, the set of one or more one-to-one vector associations can be identified (wherein, in the set of vector associations, each translation vector occurs a maximum of once only), by means of which the overall value of vector similarity is increased, and particularly is maximized. The value of the measure of similarity for the specified potential observation pair can then be determined in a particularly accurate manner on the basis of the overall value of vector similarity. In particular, the overall value of vector similarity can correspond to the value of the measure of similarity.

As described above, on the basis of values for the measure of similarity thus determined (for all potential observation pairs), an overall association of observations from the first and the second set can be determined. In particular, one-to-one associations can be determined, which respectively indicate which first observation and which second observation are associated with the same landmark.

The device can be designed, for the one or more one-to-one associations from the overall association, to determine a respective transformation vector, by means of which the second observation in a one-to-one association is transposed to the first observation of the one-to-one association. On the basis of the one or more transformation vectors for the one or more one-to-one associations from the overall association, it is then possible to determine a uniform (e.g. a mean) transformation vector for the second set of second observations.

The device can be designed to respectively transform the one or more second observations from the second set of second observations by the application of the uniform transformation vector, in order to determine a set of transformed observations. The second set of second observations can be displaced overall, by means of a uniform transformation vector, in the direction of the first set of first observations. Mutually associated observations are thus brought into a closer mutual arrangement (at least on average).

The device can moreover be designed, on the basis of the set of transformed observations, to determine an adapted overall association. In particular, the device can be designed, by means of a clustering algorithm, to determine a set of clusters on the basis of the first set of first observations and on the basis of the set of transformed observations. The adapted overall association can then be determined on the basis of the set of clusters.

The overall association determined on the basis of values for the measure of similarity can thus be employed as a basis for the clustering of observations wherein, in the context of clustering, an adapted overall association is determined. Optionally, the adapted overall association can incorporate one or more associations which comprise more than two observations.

By the employment of a cluster algorithm, it is possible, in an efficient and reliable manner, to combine multiple observations of a landmark in a common cluster, and thus in an association of observations. Map data with respect to the route portion can then be determined with a higher degree of accuracy, on the basis of the adjusted overall association.

The first set of first observations and the second set of second observations can respectively comprise observations of landmarks, each of which represents a landmark type from a plurality of different landmark types. In other words, an observation can be associated with a specific landmark type from a plurality of different landmark types.

The plurality of landmark types can comprise at least one landmark type which is unsuitable for the determination of the measure of similarity. For example, landmarks which are arranged in a route portion in a periodically recurrent manner (such as e.g. reflector posts) can be inappropriate for the evaluation of the measure of similarity thus described.

The device can be designed to determine values for the measure of similarity only for potential observation pairs of observations which do not include an inappropriate landmark type. In other words, one or more observations which include the inappropriate landmark type can be excluded from the determination of the original overall association (based upon values for the measure of similarity). Robustness of the determination of map data can thus be increased.

The device can further be designed, for the determination of the adjusted overall association, to also consider one or more observations from the first set of first observations and/or from the second set of second observations which include an inappropriate landmark type for determining the measure of similarity. The one or more observations which include the inappropriate landmark type can thus be considered in the context of clustering. Map data can thus be determined in a particularly accurate and robust manner.

The device can be designed, for a plurality of potential one-to-one associations, to respectively determine clearance information with respect to the spatial clearance between a first observation and a second observation. The overall association can then be determined additionally on the basis of clearance information. The quality of associations thus determined can be enhanced accordingly.

Alternatively or additionally, the device can be designed, for a plurality of potential one-to-one associations, to respectively determine type information with respect to a first landmark type in the first observation and a second landmark type in the second observation. In particular, type information can indicate the similarity of the first landmark type and the second landmark type. Two observations, which respectively comprise a landmark type in the form of speed restriction traffic signs, for example, can assume a relatively high degree of similarity, even if the traffic signs indicate different speed restrictions. Conversely, an observation of a light signal installation and an observation of a traffic sign can potentially assume a relatively low degree of similarity.

The overall association can then be additionally determined on the basis of type information. The quality of associations thus determined can be enhanced accordingly.

According to a further aspect, a method is described for determining map data with respect to a route portion, particularly with respect to a node point. The method comprises the acquisition of a first set of first observations during a first trip along the route portion, and a second set of second observations during a second trip along the route portion. The method further comprises the determination of values of a measure of similarity for different possible observation pairs, each consisting of a first observation and a second observation.

The method further comprises the determination, on the basis of values for the measure of similarity of different potential observation pairs, of an overall association comprising one or more one-to-one associations between, in each case, one first observation from the first set and one second observation from the second set. The method moreover comprises the determination of map data with respect to the route portion, on the basis of the overall association.

Map data described in the present document can be employed by a vehicle guidance system of a vehicle for the delivery of a driving function. In particular, the driving function can be designed for the automated longitudinal guidance of the vehicle at and/or in conjunction with a signaling unit (particularly having a signal generator). The driving function can be configured in accordance with SAE Level 2. In other words, the driving function can optionally deliver automated driving and/or driver support (with respect to longitudinal guidance) in accordance with SAE Level 2. The driving function can be limited to longitudinal guidance of the vehicle. Lateral guidance of the vehicle during operation can be executed manually by the driver, or can be delivered by a further and/or separate driving function (e.g. a lane assist system).

In the context of the driving function, automated longitudinal guidance of the vehicle can be executed in accordance with a set speed or target speed and/or in accordance with a target clearance to a leading vehicle which is driving (directly) ahead of the vehicle. To this end, the driving function can deliver a speed regulation function, by means of which the actual driving speed of the vehicle is adjusted and, in particular, is regulated to the set speed or target speed. Alternatively or additionally, a clearance regulation function can be delivered, by means of which the actual clearance of the vehicle to the leading vehicle is adjusted and, in particular, is regulated to the target clearance. If no relevant leading vehicle is present, or if the leading vehicle is driving more rapidly than the set speed or target speed, the driving speed of the vehicle can be regulated. Alternatively or additionally, if the leading vehicle is driving more slowly than the set speed or target speed, the clearance of the vehicle to the leading vehicle can be regulated. The driving function can thus be designed to deliver an Adaptive Cruise Control (ACC) driver assistance function.

A vehicle can comprise a user interface for interaction with a user, particularly with the driver of the vehicle. The user interface can comprise one or more control elements which permit the user to define the set speed or target speed and/or the target clearance. Alternatively or additionally, the one or more control elements can permit the user to confirm a previously defined set speed and/or target speed and/or a previously defined target clearance of the vehicle for the operation of the driving function. The one or more control elements can be configured for actuation by a hand and/or by a finger of the driver. Alternatively or additionally, the one or more control elements can be arranged on a steering means (particularly on a steering wheel or a steering yoke) of the vehicle.

An exemplary control element (particularly a plus/minus control element) is a key and/or a rocker button, by means of which the set speed and/or the target speed or the target clearance can be increased or reduced. A further exemplary control element (particularly a setting control element) is a key, by means of which a current driving speed of the vehicle can be defined as a set speed and/or a target speed, or by means of which a current clearance of the vehicle to the leading vehicle can be defined as a target clearance. A further exemplary control element (particularly a reset control element) is a key, by means of which a previously set speed and/or target speed or a previously set target clearance can be reconfirmed or reactivated.

The user interface can further comprise one or more output elements (e.g. a screen and/or a loudspeaker and/or a vibrating element), by means of which outputs can be delivered to the user of the vehicle.

The driving function can further be designed for the consideration, in automated longitudinal guidance, of one or more signaling units on the carriageway (particularly the roadway) or driving route on which the vehicle is driving. A signaling unit can be provided for the confirmation of an approach to a node point (particularly an intersection) on the road network on which the vehicle is traveling. Confirmation of this approach can be temporally variable (e.g. in the case of a light signal installation, for example a traffic light, comprising one or more different signal groups for one or more different directions of travel of the vehicle) or permanently defined (e.g. in the case of a traffic sign, for example a stop sign).

During the operation of the driving function, data can be acquired with respect to an approaching signaling unit in the direction of travel of the vehicle. These data can comprise map data with respect to signaling units in the road network on which the vehicle is traveling. Map data can respectively comprise one or more attributes of a signaling unit. The one or more attributes of a signaling unit can indicate or comprise:

the type of signaling unit, particularly a distinction as to whether the signaling unit is a light signal installation or a traffic sign; and/or the number of different signal groups in the signaling unit for different directions of travel at the node point of the road network on which the signaling unit is arranged or with which the signaling unit is associated; and/or the position (e.g. the GPS coordinates) of the signaling unit and/or the stop line of the signaling unit within the road network; and/or the relative clearance between the stop line and the associated signaling unit.

The driving function can be designed, by the employment of a position sensor (e.g. a GPS receiver) of the vehicle and/or by the employment of odometry, to determine the actual position (e.g. the current GPS coordinates) of the vehicle within the road network. By reference to map data, a (e.g. the next) signaling unit on the driving route of the vehicle can then be detected. Moreover, one or more mapping attributes can be determined with respect to the signaling unit thus detected.

Alternatively or additionally, data with respect to an approaching signaling unit in the direction of travel of the vehicle can comprise environmental data with respect to the signaling unit, or can be determined on the basis of environmental data. Environmental data can be acquired by one or more environment sensors of the vehicle. Exemplary environment sensors include a camera, a radar sensor, a Lidar sensor, etc. The one or more environment sensors can be designed to acquire sensor data (i.e. environmental data) with respect to the environment in the direction of travel of the vehicle.

The driving function can be designed, on the basis of environmental data (particularly on the basis of sensor data from a camera), to detect that a signaling unit is arranged in the direction of travel ahead of the vehicle. To this end, e.g. an image analysis algorithm can be employed. Moreover, the driving function can be designed, on the basis of environmental data, to determine the type of signaling unit (e.g. a light signal installation or traffic sign). The driving function can moreover be designed, on the basis of environmental data, to identify the (signaling) status of the signaling unit with respect to permission for the crossing of the node point which is associated with the signaling unit. In particular, the colors (green, amber or red) of the one or more signal groups of a light signal installation can be determined.

The driving function can be designed for the consideration of a signaling unit detected in the automated longitudinal guidance of the vehicle. In particular, the driving function can be designed, on the basis of data with respect to the signaling unit thus detected, particularly on the basis of the color of a light signal or of a signal group of the signaling unit, to determine whether or not the vehicle is required to stop at the signaling unit, particularly at the stop line of the signaling unit. For example, it can be detected that the vehicle is required to stop, as the relevant signal group for the vehicle is red. Alternatively, it can be detected that the vehicle is not required to stop, as the relevant signal group for the vehicle is green. In a further example, it can be detected that the vehicle is required to stop, as the signaling unit is a stop sign.

The driving function can further be designed to actuate the automatic stopping of the vehicle at the signaling unit thus detected, if it is determined that the vehicle is required to stop at the signaling unit. To this end, an automated deceleration process (down to a standstill) is initiated. The vehicle can thus be automatically guided to, or to a position ahead of the stop line of the signaling unit. During the automated deceleration process, one or more wheel brakes (e.g. one or more friction brakes or one or more regenerative brakes) can be actuated automatically by the driving function, in order to brake the vehicle (to a standstill). The time characteristic of the deceleration thus actuated can be dependent upon the available braking distance to the signaling unit detected.

Alternatively or additionally, the driving function can be designed for the automated longitudinal guidance of the vehicle past the signaling unit thus detected, particularly over the stop line of the signaling unit, if it is determined that the vehicle is not required to stop at the signaling unit. The speed and/or clearance control function can be maintained in accordance with the set speed or target speed and/or in accordance with the target clearance to the vehicle ahead.

The driving function can thus be designed to deliver an ACC function, in consideration of signaling units. The driving function is also described in the present document as an Urban Cruise Control (UCC) driving function.

As described above, the driving function can be designed for the automated longitudinal guidance of the vehicle, in the context of the operation of the driving function, in accordance with a target speed and/or in accordance with a target clearance to a leading vehicle which is driving ahead of the vehicle. The driving function can further be designed, in the event that an (optionally detected) signaling unit is not considered by the driving function, for the automated longitudinal guidance of the vehicle, in accordance with the target speed and/or in accordance with the target clearance, past the signaling unit, and particularly across the stop line of the signaling unit, particularly independently of the color of the light signal of the signaling unit. The driving function (in the event of the non-consideration of a signaling unit) can thus optionally be operated in the manner which would apply, were the signaling unit) and thus the associated node point) not present.

The driving function can optionally permit the user of the vehicle to configure the driving function by means of the user interface (e.g. in a configuration menu). A setting can optionally be established as to whether the driving function is to be operated in an automatic mode or is to be operated in a manual mode.

In the automatic mode, the driving function can be operated such that a detected signaling unit, which is approaching in the direction of travel, is automatically considered in the operation of the driving function (and optionally results in an automated deceleration of the vehicle). In particular, the driving function, in the automatic mode, can be designed to consider a signaling unit which is automatically detected on the basis of map data and/or environmental data, particularly in the absence of confirmation by the user of the vehicle, in the automated longitudinal guidance of the vehicle (e.g. in order to achieve an automated deceleration of the vehicle at the signaling unit detected, if required).

Conversely, in the manual mode, the driving function can be operated such that the signaling unit detected is only considered in the automated longitudinal guidance of the vehicle (optionally resulting in the automated deceleration of the vehicle) further to confirmation by the user of the vehicle. In particular, the driving function, in the manual mode, can be designed (via the user interface of the vehicle) to deliver an output of options with respect to the consideration of the signaling unit thus detected for the attention of the user of the vehicle. For example, it can be indicated on the screen that a signaling unit has been detected, and that feedback from the user is required (in order to actuate the consideration of the signaling unit in the automated longitudinal guidance of the vehicle). The signaling unit detected (particularly the signaling status of the signaling unit) can then be considered (and, in particular, can only be considered) in the automated longitudinal guidance of the vehicle at the signaling unit, in the event of a response on the part of the user to the options indicated (e.g. by the actuation of a control element, particularly of the setting control element). Optionally, an automated deceleration of the vehicle at the signaling unit detected is then executed. Alternatively, the driving function can be designed not to consider and/or to ignore the signaling unit detected (particularly the signaling status of the signaling unit) in the automated longitudinal guidance of the vehicle at the signaling unit, in the absence of a response on the part of the user to the options indicated. In this case, the speed and/or clearance regulation function can continue (with no consideration of the signaling unit, particularly in the manner which would apply, were the signaling unit not present).

By the provision of different (adjustable) modes for the operation of the driving function (particularly of the UCC driving function), the convenience of the driving function can be further enhanced.

The driving function can be configured to notify the user of the driving function, by reference to the user interface, of the status of the driving function. In particular, the user of the driving function can be notified as to whether an approaching signaling unit detected in the direction of travel is considered, or otherwise, in the operation of the driving function, and particularly in the automated longitudinal guidance of the vehicle.

The driving function can be designed (e.g. on the basis of map data and/or environmental data) to determine whether an approaching signaling unit in the direction of travel is considered in the operation of the driving function, or whether the latter can or cannot be considered in the operation thereof. If the signaling unit is considered, or can be considered, an availability output, particularly an availability indication, can optionally be delivered, in order to notify the user to the effect that the approaching signaling unit is considered in the automated longitudinal guidance of the vehicle (and thus, if required, an automated deceleration of the vehicle at the signaling unit is executed).

Alternatively or additionally, the driving function can be designed (if it is established that the approaching signaling unit is not considered, or cannot be considered in the driving function), a non-availability output, particularly a non-availability indication can be delivered (via the user interface) in order to notify the user of the vehicle to the effect that the approaching signaling unit is not considered in the automated longitudinal guidance of the vehicle (and thus, likewise, that no automated deceleration of the vehicle is executed, according to the signaling status of the signaling unit).

By the generation of an availability and/or an unavailability output, the convenience and safety of the driving function can be further enhanced. Availability and/or non-availability outputs can respectively comprise an optical, an acoustic and/or a haptic output.

The driving function can be designed to identify a change in the signaling status of the signal group of the signaling unit which is relevant to the direction of travel of the vehicle (e.g. during the approach of the vehicle to the signal group, or while the vehicle is stationary at the signal group. For example, it can be detected that a phase change from red to green has occurred.

The driving function can moreover be designed (in response to the phase change detected) to initiate the communication of information with respect to the altered signaling status of the signal group of the signaling unit to the driver of the vehicle. For example, by means of an output element (particularly on a screen) of the user interface, the display of a symbol of the detected signaling unit (which can optionally be considered in automated longitudinal guidance) can be generated for such time as the signal group assumes the color red. Further to the detection of a phase change to green, the symbol displayed can then be removed, or the output can be terminated. It can thus be communicated to the driver of the vehicle in a reliable manner that, e.g. following the stoppage of the vehicle at the signaling unit, an (optionally automated) start-up process can be initiated (e.g. by the actuation of a control element on the user interface).

The driving function can be designed to generate the output of a take-over request for the attention of the driver, if the driving function is interrupted. For example, it can be detected that automated longitudinal guidance (in accordance with the set speed and/or the target speed and/or in accordance with the target clearance) cannot be continued, or is not being continued. An interruption of the driving function can be executed e.g. if the driver of the vehicle (substantially) intervenes in the longitudinal guidance of the vehicle (e.g. wherein the driving of the vehicle actuates the brake pedal or the accelerator pedal). The output of a take-over request (TOR) can then be generated for the attention of the driver of the vehicle. Longitudinal guidance must then be resumed by the driver. By the output of a take-over request, operational safety of the vehicle can be enhanced.

According to a further aspect, a (road) motor vehicle is described (particularly a passenger motor vehicle, a heavy goods vehicle, a bus or a motorcycle) which comprises the vehicle guidance system described in the present document for the operation of a driving function.

According to a further aspect, a software (SW) program is described. The SW program can be designed to be executed on a processor (e.g. on a control device of a vehicle and/or on an external off-vehicle unit), and thus for the execution of at least one of the methods described in the present document.

According to a further aspect, a storage medium is described. The storage medium can comprise a SW program which is designed to be executed on a processor, and thus for the execution of at least one of the methods described in the present document.

In the context of the document, the term "automated driving" can be understood as driving with automated longitudinal or lateral guidance, or as autonomous driving with automated longitudinal and lateral guidance. Automated driving can comprise, for example, temporally prolonged driving on a motorway, or time-limited driving in the context of parking or maneuvering. The term "automated driving" encompasses automated driving with an arbitrary degree of automation. Exemplary degrees of automation include assisted, partially-automated, highly-automated or fully-automated driving. These degrees of automation have been defined by the Federal Highways Agency ("Bundesanstalt für Straßenwesen" or "BASt") (see BASt publication "Research abstracts", November 2012 edition). During assisted driving, the driver is continuously responsible for lateral and longitudinal guidance, whereas the system respectively assumes other functions, within specific limits. In partially-automated driving (PAD), the system assumes longitudinal and lateral guidance for a specific time period and/or in specific situations, wherein the driver is required to continuously monitor the system, as per assisted driving. In highly-automated driving (HAD), the system assumes longitudinal and lateral guidance for a specific time period, without the necessity for the continuous monitoring of the system by the driver; however, the driver must be capable of resuming control of the vehicle within a specific time. In fully-automated driving (FAD), the system, in a specific application, can execute the automatic management of driving in all situations; in this application, a driver is no longer required. The four above-mentioned levels of automation correspond to SAE Levels 1 to 4 defined in SAE Standard J3016 (SAE—Society of Automotive Engineering). For example, highly-automated driving (HAD) corresponds to Level 3 under SAE Standard J3016. SAE Standard J3016 further provides for SAE Level 5 as the highest degree of automation, which is not included in the definition applied by the BASt. SAE Level 5 corresponds to driverless driving, wherein the system can execute the automatic management of all situations throughout the entire journey, in the same way as a human driver; in general, a driver is no longer required. The aspects described in the present document relate specifically to a driving function or an assisted driving function which is configured in accordance with SAE Level 2.

It should be observed that the methods, devices and systems described in the present document can be employed either in isolation, or in combination with other methods, devices and systems described in the present document. Moreover, any aspects of the methods, devices and systems described in the present document can be mutually combined in a variety of ways. In particular, the features of the claims can be mutually combined in a variety of ways.

The invention is described in greater detail hereinafter with reference to exemplary embodiments.

BRIEF DESCRIPTION OF THE DRAWINGS

FIG. 1 shows exemplary components of a vehicle;
FIG. 2a shows an exemplary light signal installation;
FIG. 2b shows an exemplary traffic sign;
FIG. 7 shows a flow diagram of an exemplary method for the determination of map data.

DETAILED DESCRIPTION

Figure 3:
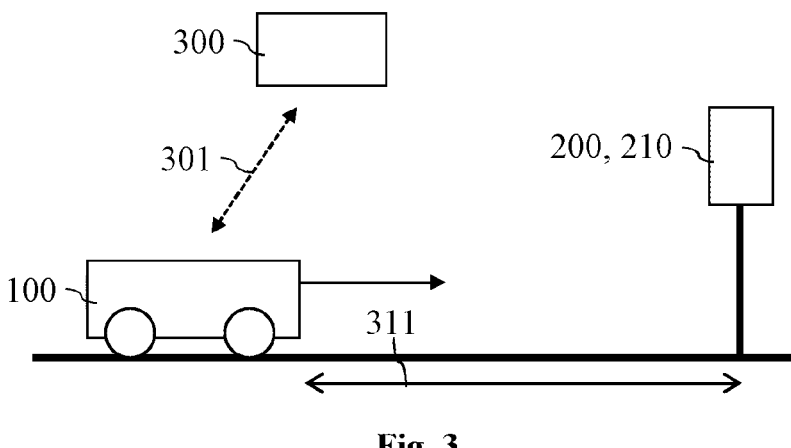
FIG. 3 shows an exemplary traffic situation.

As indicated above, the present document addresses the enhancement of the availability, the reliability and/or the convenience of a driving function, particularly of an assisted driving system of a vehicle, e.g. in conjunction with a signaling unit at a node point on the carriageway on which the vehicle is traveling. In particular, the present document addresses the provision of accurate map data for the operation of a driving function.

FIG. 1 shows exemplary components of a vehicle 100. The vehicle 100 comprises one or more environment sensors 103 (e.g. one or more imaging cameras, one or more radar sensors, one or more Lidar sensors, one or more ultrasonic sensors, etc.) which are designed to acquire environmental data with respect to an environment of the vehicle 100 (particularly with respect to the environment in the direction of travel of the vehicle 100). The vehicle 100 moreover comprises one or more actuators 102 which are designed to influence the longitudinal and/or lateral guidance of the vehicle 100. Exemplary actuators 102 include: a braking installation, a drive motor, a steering system, etc.

The control unit 101 can be designed, on the basis of sensor data from the one or more environment sensors 103 (i.e. on the basis of environmental data) to deliver a driving function, particularly an assisted driving function. For example, on the basis of sensor data, an obstacle in the trajectory of the vehicle 100 can be detected. In response thereto, the control unit 101 can actuate one or more actuators 102 (e.g. the braking installation) in order to automatically decelerate the vehicle 100, and thus prevent any collision of the vehicle 100 with the obstacle.

Particularly in the context of the automated longitudinal guidance of a vehicle 100, in addition to a leading vehicle, one or more signaling units (e.g. a light signal installation and/or a traffic sign) on the road or carriageway on which the vehicle 100 is traveling can also be considered. In particular, the status of a light signal or traffic light can be considered, such that the vehicle 100, at a red light which is relevant to its own (planned) direction of travel, is automatically decelerated to the stop line of the traffic light or, in response to a green light, is accelerated (or re-accelerated).

In different countries, light signal installations can be of a highly heterogeneous design and, moreover, can assume varying complexity with respect to the assignment of light signals to a direction of travel. Thus, different directions of travel can be consolidated in a first group of signals, or can be controlled by one signal group, whereas another direction can be controlled by another signal group. Repeating signals in a signal group can, moreover, be geographically located at different points of an intersection. It can thus be difficult for a control unit 101 (also described in the present document as a vehicle guidance system) to detect, on the basis of sensor data, which one or more signals of a light signal installation at an intersection are relevant to the planned direction of travel of the vehicle 100, and those which are not (particularly if the vehicle 100 is still at a relatively long distance from the light signal installation).

FIG. 2a shows an exemplary light signal installation 200. The light signal installation 200 represented in FIG. 2a comprises four different signal generators 201, which are arranged at different positions in an approach to an intersection. The left-hand signal generator 201 comprises a leftward-pointing arrow 202, thereby indicating that this signal generator 201 is relevant for vehicles turning left. The two central signal generators 201 comprise an upward-pointing arrow 202 (or no arrow 202), thereby indicating that these two signal generators 201 apply to onward travel straight ahead. The individual light signals of these two signal generators 201 form signal groups. Moreover, the right-had signal generator 201 comprises a rightward-pointing arrow 202, thereby indicating that this signal generator 201 is relevant for vehicles turning right.

The light signal installation 200 represented in FIG. 2a is only one example of numerous potential configurations of a light signal installation 200. A light signal installation 200 can assume a relatively large number of different characteristic features. Exemplary characteristics include:

the number of signal generators 201 and/or signal groups;
  the positions of the one or more signal generators 201; and/or
  the assignment of a signal generator 201 to a potential direction of travel at an intersection.

FIG. 2b shows a traffic sign 210 in the form of an exemplary stop sign, by means of which forward travel at a traffic node point, particularly at an intersection, is regulated. The control unit 101 of the vehicle 100 can be designed, on the basis of sensor data from the one or more environment sensors 103 (i.e. on the basis of environmental data) and/or on the basis of digital mapping information (i.e. from map data), to identify a traffic sign 210, on the road or carriageway on which the vehicle 100 is traveling, which is relevant to the forward travel of the vehicle 100.

FIG. 3 shows an exemplary vehicle 100 which, on a carriageway, is approaching a signaling unit 200, 210 (particularly a light signal installation 200 and/or a traffic sign 210). The one or more environment sensors 103 of the vehicle 100 can be designed to acquire sensor data (particularly image data) with respect to the signaling unit 200, 210. Sensor data can then be analyzed (e.g. by means of an image analysis algorithm), in order to determine the characteristics of one or more features of the signaling unit 200, 210. In particular, on the basis of sensor data, it can be determined whether the signaling unit 200, 210 is a light signal installation 200 or a traffic sign 210. It can moreover be determined which signal generator 201 of the light signal installation 200 is relevant to the (planned) direction of travel of the vehicle 100. Moreover, the (signaling) status of the relevant signal generator 201 (e.g. the color, for example red, amber or green) can be determined.

The quality and/or reliability with which, on the basis of environment data, the characteristics of a feature of a signaling unit 200, 210 can be determined, are typically dependent upon the distance 311 of the vehicle 100 from the signaling unit 200, 210. Moreover, current weather conditions typically exert a substantial influence upon the quality and/or reliability of the characteristics of a feature thus determined. Moreover, this quality and/or reliability can differ for different features.

The vehicle 100 can comprise a memory unit 104, in which digital mapping information (i.e. map data) is saved with respect to the road network on which the vehicle 100 is traveling. By way of attributes, map data can indicate the characteristics or one or more features of one or more signaling units 200, 210 in the highway or road network. In particular, map data for a light signal installation 200 can indicate the assignment of one or more signal generators 201 or signal groups to different potential directions of travel. In other words, map data can indicate which signal generator 201 or which signal group is responsible for the release of which direction of travel. Map data can optionally be received by the vehicle 100 by means of a communication unit 105 of the vehicle 100, via a wireless communication link (e.g. a WLAN or a LTE communication link).

The control unit 101 of the vehicle 100 can be designed (e.g. on the basis of the current position of the vehicle 100 and on the basis of a planned route of travel and/or on the basis of environment data from the one or more environment sensors 103) to determine that the vehicle 100 is approaching a signaling unit 200, 210 ahead. Moreover, the control unit 101, on the basis of (saved and/or received) map data, can determine the characteristics of one or more features of the approaching signaling unit 200, 210. In particular, on the basis of map data, it can be determined which signal generator 201 or which signal group of a light signal installation 200 is assigned to the current or planned direction of travel of the vehicle 100. Moreover, on the basis of environment data, the current status of the associated signal generator 201 or of the associated signal group can be determined. On the basis thereof, an automated driving function (e.g. automated longitudinal guidance of the vehicle 100) can then be executed in a reliable and convenient manner. In particular, by the consideration of map data, the characteristics of one or more relevant features of a signaling unit 200 can be determined, even in the event of a relatively large distance 311 between the vehicle 100 and the signaling unit 200, as a result of which the reliability, availability and convenience of an automated driving function can be enhanced.

A vehicle 100 can be designed to employ information with respect to a signaling unit 200, 210 which is passed or which has been passed by the vehicle 100 for the generation and/or expansion of map data. Map data can be generated and/or expanded locally by the vehicle 100 and/or centrally by an external off-vehicle unit 300 (e.g. by means of a backend server) (see FIG. 3). In the immediate vicinity of a signaling unit 200, 210, environment data can typically be detected by the one or more environment sensors 103 of a vehicle 100 which, in an accurate manner, indicate the characteristics of one or more features of the signaling unit 200, 210. In particular, in the immediate vicinity, the association of signal generators or signal groups 201 with potential directions of travel can be determined on the basis of environment data in an accurate and reliable manner.

The vehicle 100 can be designed to transmit information thus acquired (e.g. environment data and/or characteristics determined for the one or more features) to the external off-vehicle unit 300 via a wireless communication link 301 (in conjunction with an identifier for the respective signaling unit 200, 210, for example in conjunction with the position of the signaling unit 200, 210). On the basis of information provided for a plurality of vehicles 100, the external off-vehicle unit 300 can then generate and/or update map data which, by way of respective attributes of different signaling units 200, 210, indicate the characteristics of one or more features. Map data can then be delivered to the individual vehicles 100, in order to support the operation of an automated driving function (as described above).

Figure 4:
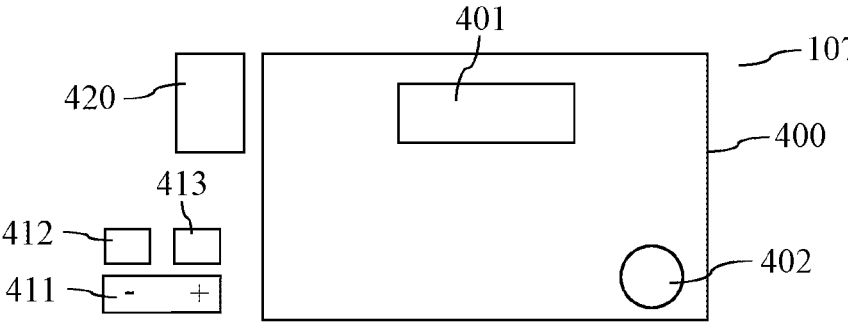
FIG. 4 shows an exemplary user interface.

The vehicle 100 typically comprises a user interface 107 having one or more control elements and/or having one or more output elements. FIG. 4 shows an exemplary user interface 107 having a display unit 400, particularly having a screen, for the output of optical information. On the display unit 400, e.g. by means of an output on a display element 401, a proposal can be delivered for the automated guidance of the vehicle 100 to an approaching signaling unit 200, 210. Alternatively or additionally, a display element 402 can optionally be provided, by means of which the status of the driving function (e.g. active or inactive) is represented.

Alternatively or additionally, the user interface 107, by way of an output element, can comprise at least one loudspeaker 420, by means of which an acoustic output (e.g. a warning tone) can be delivered to the driver of the vehicle 100.

Moreover, the user interface 107 can comprise one or more control elements 411, 412, 413, which permit the driver of the vehicle 100 to activate and/or parameterize the driving function. An exemplary control element is a rocker button 411, which permits the driver to define a set speed (i.e. a target speed) for the vehicle 100, specifically by way of an increase or a reduction thereof. A further exemplary control element is a setting control element 412, which permits the driver to establish the current driving speed as the set speed, and/or to accept a proposal for the automatic guidance of the vehicle 100 to an approaching signaling unit 200, 210 (e.g. in a manual mode of the driving function). The user interface 107 can further comprise a resumption control element 413, which permits the driver e.g. to reactivate the driving function with a previously established set speed.

The control unit 101 of the vehicle 100 can be configured to execute an automated longitudinal guidance of the vehicle 100 in an urban environment. This driving function can be described e.g. as an Urban Cruise Control (UCC) driving function. The driving function can be provided in an automatic mode (aUCC) and/or in a manual mode (mUCC). Optionally, by means of the user interface 107, the driver can be permitted to establish whether the driving function is to be operated in the automatic or in the manual mode.

The control unit 101 of the vehicle 100 can be designed, on the basis of environment data from the one or more environment sensors 103 and/or on the basis of map data (in conjunction with position data from the position sensor 106 of the vehicle 100) to detect an approaching signaling unit 200, 210 on the driving route of the vehicle 100. In the manual mode of the UCC driving function, a proposal or query can then be delivered as an output on the user interface 107, as to whether the signaling unit 200, 210 is to be considered in the automated longitudinal guidance of the vehicle 100 or otherwise. The driver of the vehicle 100 can then, e.g. by the actuation of the setting control element 412, accept or reject/ignore the proposal. Conversely, in the automatic mode of the UCC driving function, the signaling unit 200, 210, optionally, can be automatically considered in the automated longitudinal guidance of the vehicle 100 (i.e. without the necessity of feedback from the driver).

If the signaling unit 200, 210 thus detected is considered in the automated longitudinal guidance of the vehicle 100, (depending upon the type and/or (signaling) status of the signaling unit 200, 210), an automatic deceleration can thus be initiated, in order to bring the vehicle 100 automatically to a standstill (e.g. at a red traffic light or at a stop sign). Moreover, (e.g. further to a change in the (signaling) status of the signaling unit 200, 210, for example after a change to green), an automatic start-up of the vehicle 100 can be initiated. The vehicle 100 can then be automatically reaccelerated to the set speed (in consideration of any stipulated minimum or target clearance to a leading vehicle).

By means of the UCC driving function, the driver of a vehicle 100 can thus be permitted to employ the ACC driving function, even on a road having one or more signaling units 200, 210 (without the necessity for the deactivation and reactivation of the ACC function at each of the individual signaling units 200, 210).

The control unit 101 can be designed to determine, on the basis of environment data and/or on the basis of map data, whether an approaching signaling unit 200, 210 can or cannot be considered in automated longitudinal guidance. If it is established that the approaching signaling unit 200, 210 cannot be considered in automated longitudinal guidance, an output (e.g. an optical output on a display unit 400, 402) can be delivered to the driver of the vehicle 100, in order to notify the driver of the vehicle 100 to the effect that the approaching signaling unit 200, 210 cannot be considered in automated longitudinal guidance. This indication can be described as a "non-availability indication". It is then the responsibility of the driver of the vehicle 100, if necessary, to decelerate the vehicle 100 during the approach to the signaling unit 200, 210 (e.g. on the grounds of a switchover of a traffic light to red, or where the signaling unit 200, 210 is a stop sign).

The control unit 101 can moreover be designed, during the operation of the UCC driving function, to detect that the vehicle 100 cannot (or can no longer) be automatically longitudinally guided (e.g. on the grounds that a manual intervention of the driver in the longitudinal guidance of the vehicle 100 is required). In this case, a take-over request (TOR) output can be delivered for the attention of the driver of the vehicle 100, in order to instruct the driver to assume the manual longitudinal guidance of the vehicle 100.

The quality of a driving function is also dependent upon the quality of map data which are employed e.g. for the determination of the position of a signaling unit 200, 210 and/or the position of a stop line of a signaling unit 200, 210. The external off-vehicle unit 300 can be designed, for a specified location or for a specified route portion of a road network, e.g. at a specific node point, to acquire driving data for a plurality of different vehicles 100 and/or for a plurality of different journeys at the location thus specified, particularly by the reception thereof via a communication link 301.

Driving data for travel at the specified location can comprise environment data from one or more environment sensors 103 (particularly from a camera) of the vehicle 100 and/or trajectory data with respect to the driving trajectory of the vehicle 100 during travel at the specified location. Trajectory data can indicate the pathway or track of the vehicle during travel at the specified location. Trajectory data can be acquired by reference to a position sensor 106 (particularly by reference to a GPS receiver) and/or by reference to vehicle odometry.

On the basis of driving data, a landmark map for the specified location can be generated and/or updated. The landmark map can indicate one or more landmarks, particularly the position of one or more landmarks, at the specified location. Exemplary landmarks include a signaling unit 200, 210, a stop line at a node point, a road marking, etc.

For the determination of a landmark map on the basis of driving data, a SLAM algorithm (Simultaneous Localization and Mapping) can be employed in order to determine, from driving data, particularly from GNSS data, odometry data and/or camera observations which are collected and communicated from a plurality of vehicles 100 and/or from a plurality of journeys, the position, orientation and semantic information for one or more landmarks, and the translation thereof into mapping attributes in a map.

In order to permit SLAM optimization on the basis of driving data from a plurality of vehicles and/or from a plurality of journeys along the route portion considered, i.e. on the basis of driving data from a plurality of different observations, it is typically necessary for an association of individual observations with one or more different landmarks to be established. In other words, it is necessary to determine which observations are associated with the same landmark, and which observations relate to different landmarks. In the absence of such association, each journey along the route portion would result in the generation of a dedicated landmark entity for each landmark which is located in the route portion.

One option for the association of two different landmark observations of the same landmark type is an association based upon the clearance between two observations of a landmark of the same type. The association of two observations of the same landmark can occur e.g. in the event that the clearance lies below a predefined clearance threshold value.

If numerous landmarks, particularly landmarks of the same type, are arranged in a grouped manner and in relatively close mutual spatial proximity (as may be the case, e.g. at a node point having a plurality of signaling units 200, 210), an association of landmarks based upon the clearance between two observations is typically associated with a relatively high error rate. For example, it can occur that, on a grounds of a measuring error in the vehicle positioning of a vehicle 100, all observations of the vehicle 100 during a trip along the route portion are systematically displaced and/or skewed, such that an exclusively clearance-based association will result in erroneous associations.

An erroneous association of observations typically results in errors with respect to the determined position (e.g. the GPS coordinates) of a landmark and/or in the generation of a landmark which has no corresponding physical equivalent (e.g. a "false positive"). This can particularly occur in the case of a light signal installation 200 at an intersection, wherein the light signal installation 200 can comprise a plurality of landmarks (e.g. signal generators 201) of the same type, which are generally arranged in relatively close mutual proximity. As a result, erroneous associations can occur, particularly during the learning process for an urban landmark map.

Moreover, in the context of a UCC driving function, a problem can occur in that switchover time points of the different signal generators 201 of a light signal installation 200 observed on the basis of environment data, on the grounds of an association error, are at least partially assigned to the incorrect signal generator 201. As a result, the determination of one or more signal groups having a plurality of identically phased signal generators 201 can be corrupted, thus potentially impacting upon the convenience of the UCC driving function.

Initially, in the interests of simplification, it can be assumed that, for a trip of a vehicle 100 along the route portion, a maximum of one single observation can occur. A case in which, for example on the grounds of a temporary loss of visibility of a landmark to the camera 103 of the vehicle 100 and/or in the event of sequential evaluation time points, two observations of the same landmark are acquired, is considered hereinafter.

In the event that a maximum of one observation per trip and per landmark is assumed, the issue of assignment can be formulated such that, for each trip pair A, B along a route portion, an association of individual monitoring operations or observations can be established. In order to permit the most accurate association possible of landmark observations during the two trips A, B, the circumstance can be exploited whereby the measured relative positions of two different, but spatially proximate landmarks during a trip are relatively accurate. On the basis hereof, a landmark observation in trip A can be assigned to an observation in trip B, the local environment of which most closely resembles the local environment of the observation concerned in trip A. Thus, for a pair of observations from the trips A, B, the value of a measure of similarity can be determined, wherein the measure of similarity considers the similarity between the local environment of the observation from trip A and the local environment of the observation from trip B, and/or is described in accordance with similarity. Moreover, for the association of observations, the magnitude of the positional difference between observations which are to be mutually associated can be considered. Alternatively or additionally, differences in the respective (landmark) type and/or the probability of the identification by the sensor system 103 of a landmark of the type from the first observation in combination with the type from the second observation can be taken into consideration.

Figure 5A:
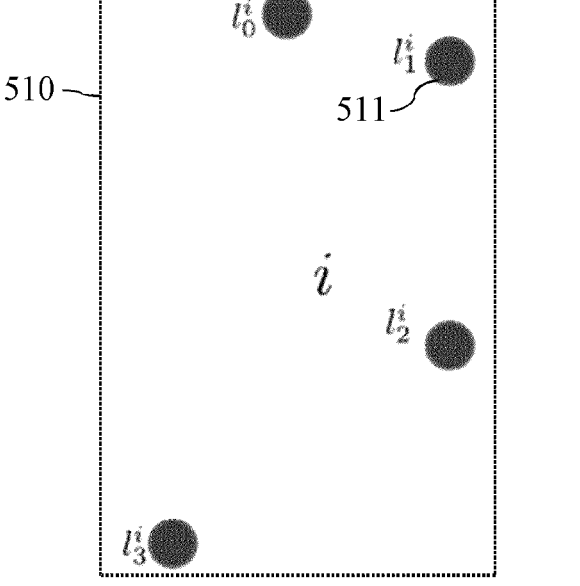
FIGS. 5a, 5b, and 5c show exemplary steps for the assignment of observations.
Figure 5A:
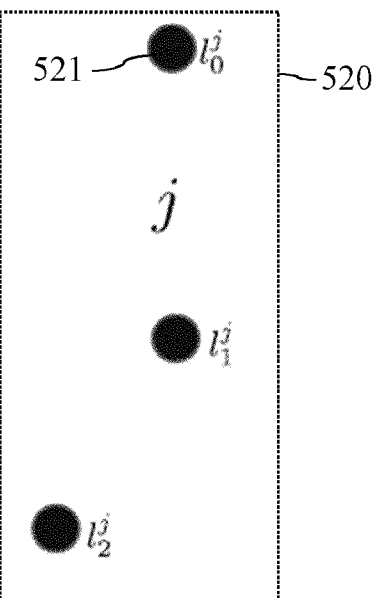

The method for the classification of observations is illustrated in FIGS. 5a to In particular, FIG. 5a shows a first set 510 of first observations 511 during a first trip along a route portion. Moreover, FIG. 5a shows a second set 520 of second observations 521 during a second trip along the route portion. As can be seen from FIG. 5a, observations 511, 521 are arranged at different positions. These different positions can be at least partially caused by a uniform offset between the first observations 511 in the first set 510 and the second observations 512 in the second set 520.

The position or location of the first observations 511 is described by $l^i_q$, where q=0, 1, 2, 4, . . . , and the position or location of the second observations 512 is described by $l^r_r$, where r=0, 1, 2, . . . . Each individual first observation 511, at least in theory, can be associated with each individual second observation 521. If the first set 510 comprises Q first observations 511 and the second set 520 comprises R second observations 521, theoretically at least Q×R associations or observation pairs are possible.

Figure 5B:
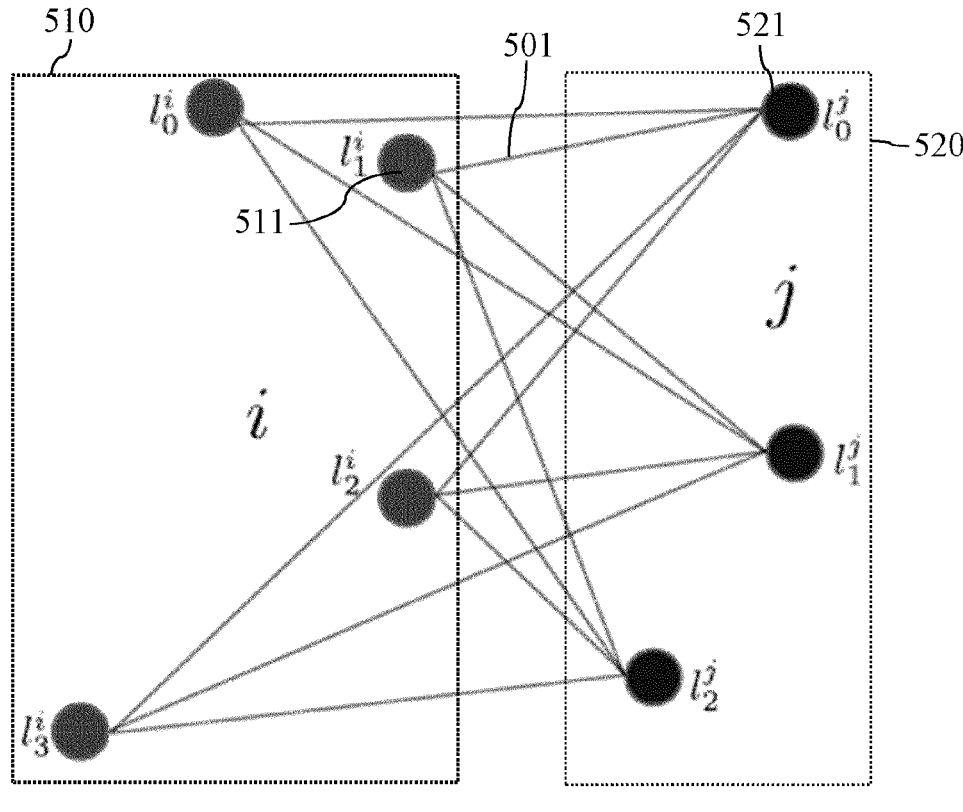

For each potential association, i.e. for each potential pair of a first observation 511 and a second observation 521, as illustrated in FIG. 5b, the value 501 of a measure of similarity can be determined with respect to the similarity of the environment of the first observation 511 with the environment of the second observation 521. The values 501 of the measure of similarity thus determined for all potential pairs of observations 511, 521 can then be used to determine an overall association of first observations 511 from the first set 510 with second observations 521 from the second set 520. The overall association thus comprises a set of one-to-one associations (or observation pairs) between exactly one first observation 511 and exactly one second observation 521 wherein, for each observation 511, 521, a maximum of one one-to-one association between the first and second sets 510, 520 is provided in each case.

Figure 5C:
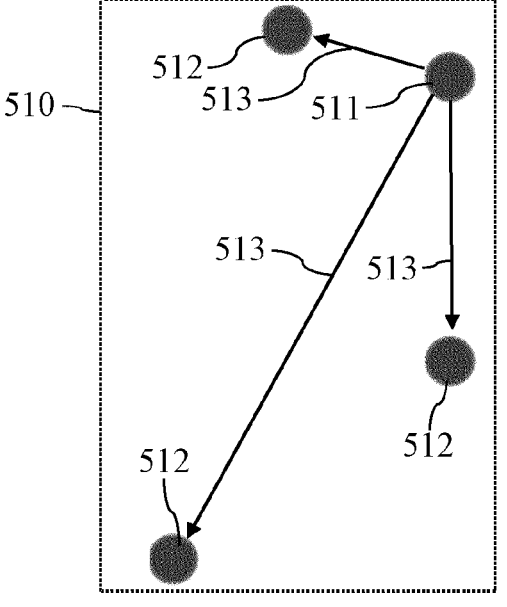
Figure 5C:
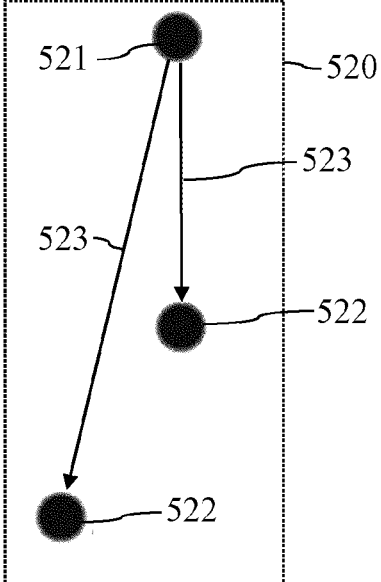

FIG. 5c illustrates the determination of the value of the measure of similarity between a first observation 511 and a second observation 521. The environment of the first observation 511 can be described by a set of first translation vectors 513 between the first observation 511 and the adjacent observations 512 in the first set 510. The first translation vector $\vec{v}_n$ 513 between the first observation 510 and an adjacent observation 512 describes:

the clearance between the first observation 511 and the adjacent observation 512; and the direction, particularly the angle in which the adjacent observation 512 is arranged relative to the first observation 511.

In a corresponding manner, for the second observation 521, a set of second translation vectors $\vec{v}_m$ 523 vis-à-vis adjacent observations 522 can be determined from the second set 520.

A set of first translation vectors 513 can thus be determined for the first observation 511, and a set of second translation vectors 523 for the second observation 521, wherein the respective set of translation vectors 513, 523 describes the environment of the respective observation 511, 521. For the determination of the value 501 of the measure of similarity, initially, one or more vector associations can respectively be determined between a first translation vector 513 and a second translation vector 523. A vector association can thus be established between the two translation vectors 513, 523 which are most similar with respect to magnitude and/or direction.

The value of a vector similarity between a first translation vector 513 and a second translation vector 523 can thus be determined. The vector similarity can be dependent upon the similarity of the angle and/or upon the similarity of the magnitude of the translation vectors 513, 523. The vector similarity $s(\vec{v}_n, \vec{v}_m)$ between the first translation vector $\vec{v}_n$ and the second translation vector $\vec{v}_m$ can particularly be determined as follows:

$$s(\vec{v}_n, \vec{v}_m) = \frac{\left(\frac{\vec{v}_n \vec{v}_m}{|\vec{v}_n||\vec{v}_m|}\right)\left(\frac{\min\{|\vec{v}_n|, |\vec{v}_m|\}}{\max\{|\vec{v}_n|, |\vec{v}_m|\}}\right) + 1}{2},$$

wherein the vector similarity $s(\vec{v}_n, \vec{v}_m)$ e.g. assumes values between 0 and 1.

Alternatively or additionally, the vector similarity $s(\vec{v}_n, \vec{v}_m)$ between the first translation vector $\vec{v}_n$ and the second translation vector $\vec{v}_m$ can be determined as follows:

$$s(\vec{v}_n, \vec{v}_m) = \frac{\left(\frac{\vec{v}_n \vec{v}_m}{|\vec{v}_n||\vec{v}_m|}\right) + 1}{2}\left(\frac{\min\{|\vec{v}_n|, |\vec{v}_m|\}}{\max\{|\vec{v}_n|, |\vec{v}_m|\}}\right),$$

i.e. as the product of the directional similarity and the distance similarity of the two translation vectors.

On the assumption that the set of first translation vectors 513 comprises N first translation vectors 513 (e.g. where N=Q−1), and that the set of second translation vectors 514 comprises M second translation vectors 523 (e.g. where M=R−1), where M≤N, M! potential overall vector associations, each comprising M one-to-one vector associations between one first translation vector 513 and one second translation vector 523 respectively are possible. For each overall vector association, on the basis of values of vector similarity $s(\vec{v}_n, \vec{v}_m)$ for the M one-to-one vector associations in the overall vector association, an overall value of vector similarity can be determined. In particular, the overall value w of vector similarity can be determined as a mean value of vector similarity $s(\vec{v}_n, \vec{v}_m)$ for the M one-to-one vector associations in the overall vector association.

From the set of overall vector associations, that overall vector association can be selected which assumes the optimum, particularly the highest overall value w of vector similarity. The optimum, particularly the highest overall value w of vector similarity can then be employed as a value 501 of the measure of similarity for the similarity of the environment of the first observation 511 and the second observation 521.

In a corresponding manner, for each potential pairing of a first observation q 511, where q=0, 1, . . . , Q, and a second observation r 521, where r=0, 1, . . . , R, a respective value $w_{q,r}$ 501 of the measure of similarity can be determined.

On the basis of values $w_{q,r}$ 501 of the measure of similarity for all potential pairings of observations 511, 512, the overall association between the individual first observations 511 in the first set 510 and the individual second observations 521 in the second set 520 can then be determined, by means of which an overall value C of the measure of similarity is optimized, and in particular is maximized. The overall value C of the measure of similarity in a potential overall association can be determined e.g. on the basis of, or as a mean value of the individual values $w_{q,r}$ 501 of the measure of similarity of the individual one-to-one associations in the potential overall association.

By the comparison of the direct environments of individual observations 511, 521, a robust association of landmark observations 511, 521 in a route portion can be executed. This association, particularly the overall association, can then be employed as an input for SLAM optimization.

The association method described, in the event of the presence of multiple observations 511 of the same landmark within a set 510 of observations 511, can result in the detection of erroneous landmark records. Moreover, an erroneous observation (particularly as "false positive observation") can result in inaccuracies in the determination of the position of a landmark and/or the detection of an erroneous landmark entity.

The overall association determined by means of the association method described can be employed as a basis for the further optimization of association. An (optionally iterative) alignment or harmonization of different sets 510, 520 of observations 511, 521 can then be executed. In particular, a uniform displacement or translation of observations 521 in one set 520 can be executed, in order to establish a set of displaced or transformed observations which, at least on average, are more closely arranged in relation to the other set 510 of observations 511.

Figure 6A:
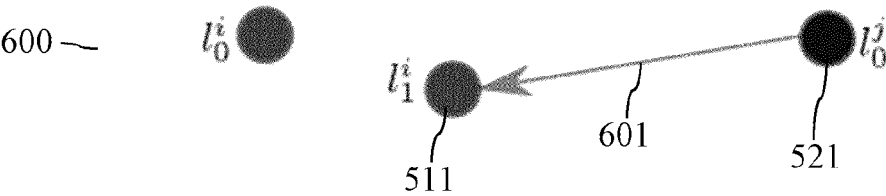
FIGS. 6a and 6b show an exemplary displacement or transformation of observations.
Figure 6A:
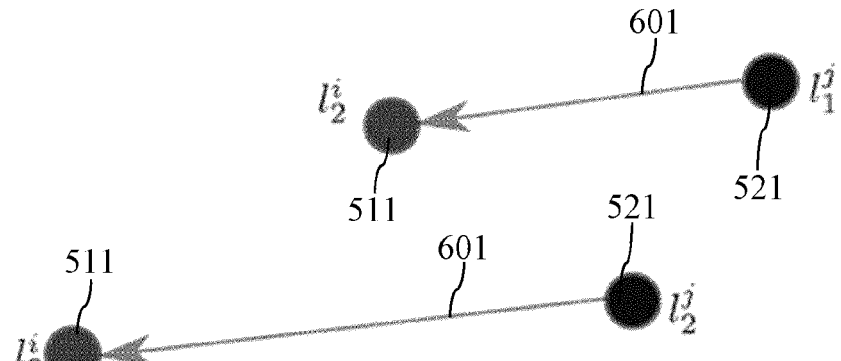
Figure 6B:
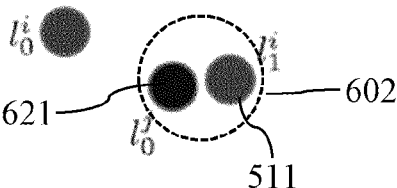
Figure 6B:
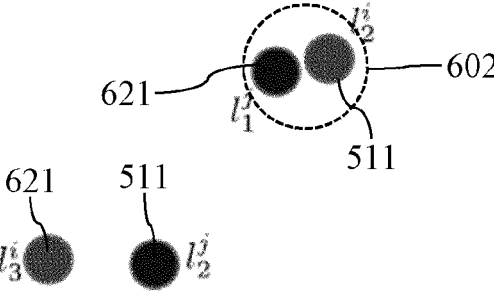

The alignment or harmonization of different sets 510, 520 of observations 511, 521 is illustrated in an exemplary manner in FIGS. 6*a* and 6*b*. In particular, FIG. 6*a* shows an overall association 600 between individual second observations 521 from a second set 520, and individual first observations 511 from a first set 510. For each associated pair of observations 511, 512, a transformation vector 601 can be determined, which is configured to displace the second observation 521 in the pair towards the first observation 511 in the pair.

Thus, for the set of one-to-one associations, a corresponding set of transformation vectors 601 can be determined. On the basis of the set of transformation vectors 601, particularly on the basis of a mean value of the set of transformation vectors 601, a uniform transformation vector for all the second observations 521 can then be determined, in order to deliver transformed observations 621 (see FIG. 6*b*) which, at least on average, are arranged more closely to the respectively associated first observations 511 than the original second observations 521.

In particular, two sets 510, 520 of observations 511, 521 (for two corresponding trips) can be acquired which, in comparison with all the available sets of observations (for all trips logged), assume the highest degree of alignment, and particularly the highest overall value for the measure of similarity of landmark observations.

For these two sets 510, 520 of observations 511, 521, a rigid body transformation (e.g. a transformation vector) can be determined which (on average) delivers the most effective possible displacement of associated landmarks towards one another. In an iterative manner, for all trips, i.e. for all available sets of observations, a respective rigid body transformation (e.g. a respective translation vector) is defined and is applied to the respective set of observations. It can thus be achieved that associated landmark observations from different trips assume the closest possible degree of spatial matching. By means of rigid body transformation, landmarks are also displaced for which no association previously existed.

On the basis of observations 521 from a plurality of trips, an overall set of transformed observations 621 can thus be generated. A cluster algorithm (such as e.g. DBSCAN) can then be applied, in order to group the overall set of transformed observations 621 in a specific number of clusters 602. Clustering can be executed independently of the originally determined one-to-one associations of observations 511, 521. In the context of clustering, a specific target number of clusters 602 (e.g. M or R) can be stipulated. Transformed observations 511, 621 which are consolidated in a cluster 602 can then be considered as observations 511, 621 of an individual landmark. Observation clusters 602 can be employed as a basis for a SLAM algorithm or for SLAM optimization. In the interests of the further improvement of the detection of landmarks, clustering of the overall set of transformed observations 621 and SLAM optimization can be repeated in an iterative manner.

By the clustering of transformed observations 621, it can be ensured that, in addition to previously existing associations, new associations, e.g. associations of two-fold observations of a landmark during a trip, are also generated.

Moreover, by means of the incremental process described, execution of the initial association can optionally be restricted to include only those landmark types which are particularly suitable for this method (e.g. traffic lights or signal generators 201, traffic signs, etc.). Conversely, reflector posts at the roadside can be excluded from consideration in the initial association, as the internal geometry of reflector posts shows a high degree of self-similarity (the clearance to the directly adjacent element e.g. is always exactly 50 m), which is typically disadvantageous for the initial association process.

Observations 511, 521 of one or more landmark types can thus be exclude from the initial association. However, the requisite associations for these observations 511, 521 can also be determined in the context of clustering. A further advantage of the employment of a clustering algorithm is provided in that, in an association by clustering, a minimum number of observations per cluster can be defined, as a result of which outliers can be robustly filtered-out.

FIG. 7 shows a flow diagram of an exemplary (optionally computer-implemented) method 700 for determining map data with respect to a route portion, particularly with respect to a node point. In particular, map data can indicate one or more landmarks on the route portion. Exemplary landmarks include the following: a signal generator 201, a stop line, a lane marking, a traffic sign, etc. Map data can respectively indicate the position and, optionally, the landmark type (e.g. signal generator, lane marking, traffic sign, etc.) of the landmark. The method 700 can be executed by an external off-vehicle unit 300.

The method 700 comprises the determination 701 of a first set 510 of first observations 511 during a first trip along the route portion and a second set 520 of second observations 521 during a second trip along the route portion. Trips can be executed by one or more vehicles 100. Observations 511, 521 can respectively have been determined on the basis of environment data and/or position data which have been acquired by one or more sensors 103, 106 of the respective vehicle 100. An observation 511, 521 can indicate a landmark. In particular, an observation 511, 521 can indicate the position and, optionally, the type of a landmark.

The method 700 further comprises the determination 702 of values 501 of a measure of similarity for different potential (in particular, for all potential) observation pairs, which are respectively comprised of a first observation 511 and a second observation 521. The value 501 of the measure of similarity for a potential observation pair can indicate the degree of mutual similarity of the environments of the two observations 511, 521. In particular, the measure of similarity for a potential observation pair comprised of a specified first observation 511 and a specified second observation 521 can indicate the similarity between the arrangement of one or more adjacent observations 512 from the first set 510, relative to the specified first observation 511, and the arrangement of one or more adjacent observations 522 from the second set 520, relative to the specified second observation 521. For each potential pairing of observations 511, 521, the degree of mutual similarity of the environments of the respective observations 511, 521 can be determined.

The method 700 further comprises the determination 703, on the basis of values 501 of the measure of similarity for different potential observation pairs, of an overall association 600 comprising one or more one-to-one associations between, respectively, one first observation 511 from the first set 510 and one second observation 521 from the second set 520. In other words, it can be determined which respective observations 511 from the first set 510 are associated in pairs with observations 521 from the second set 520, or which observations 511, 521 are mutually corresponding (indicated by the overall association 600 comprising one or more one-to-one associations).

The method 700 further comprises the determination 704 of map data with respect to the route portion, on the basis of the overall association 600. The one or more one-to-one associations between observations 511, 512 from different trips can particularly be employed in the context of a SLAM method for the identification of one or more landmarks in an accurate and reliable manner.

The present invention is not limited to the exemplary embodiments represented. In particular, it should be observed that the description and the figures are only intended to illustrate the proposed methods, devices and systems.

The invention claimed is:

1. A device for determining map data with respect to a route portion, wherein the device comprises:
   at least one processor configured to:
   acquire a first set of first observations during a first trip along the route portion, and a second set of second observations during a second trip along the route portion;
   determine values of a measure of similarity for a plurality of different potential observation pairs, each consisting of a first observation from the first set and a second observation from the second set, wherein the measure of similarity for each potential observation pair of the plurality of different potential observation pairs comprised of a specified first observation and a specified second observation indicates a similarity between an arrangement of one or more adjacent observations from the first set relative to the specified first observation, and an arrangement of one or more adjacent observations from the second set relative to the specified second observation;

wherein to determine the value of the measure of similarity for the at least one potential observation pair, the at least one processor is configured to:
   determine a set of first translation vectors from the specified first observation to the one or more adjacent observations in the first set, wherein the specified first observation and the one or more adjacent observations in the first set are all from the first set of first observations acquired during the first trip;
   determine a set of second translation vectors from the specified second observation to the one or more adjacent observations in the second set, wherein the specified second observation and the one or more adjacent observations in the second set are all from the second set of second observations acquired during the second trip; and
   determine the value of the measure of similarity for the at least one potential observation pair based on a similarity of a magnitude and/or direction of the set of first translation vectors and a magnitude and/or direction of the set of second translation vectors;
determine, on a basis of the values of the measure of similarity for the plurality of different potential observation pairs, an overall association between the first set and the second set comprising one or more one-to-one associations between, for each one-to-one association, one particular first observation from the first set and one particular second observation from the second set; and
determine map data with respect to the route portion on a basis of the overall association;
wherein a vehicle performs an automated driving function based at least in part on the map data, wherein the automated driving function comprises automated control of at least one of a speed, a braking, or a steering function of the vehicle.

2. The device according to claim 1,
wherein the at least one processor is configured to:
determine a vector similarity based on a similarity of the magnitudes and/or directions of vector pairs from a first translation vector and a second translation vector respectively; and
determine the value of the measure of similarity for the potential observation pair on the basis of the vector similarity of the one or more vector pairs.

3. The device according to claim 1, wherein:
the first set comprises Q first observations and the second set comprises R second observations; and
wherein the at least one processor is configured to:
determine, for each of the Q first observations, a respective set of Q−1 first translation vectors with regard to the respective Q−1 adjacent observations from the first set;
determine, for each of the R second observations, a respective set of R−1 second translation vectors with respect to the respective R−1 observations from the second set;
determine, for a specified potential observation pair comprising the specified first observation and the specified second observation, a vector similarity between the set of first translation vectors for the specified first observation and the set of second translation vectors for the specified second observation based on the similarity of the magnitudes and/or angles of the set of first translation vectors and the set of second translation vectors; and determine the value of the measure of similarity for the specified potential observation pair on a basis of the vector similarity determined.

4. The device according to claim 1, wherein the at least one processor is configured to:

for the determination of a vector similarity for a specified potential observation pair, for each potential combination of a first translation vector from the set of first translation vectors and a second translation vector from the set of second translation vectors, determine an individual value of the vector similarity between a respective first translation vector and a respective second translation vector in each case;

determine, on a basis of individual values for the vector similarity, a set of one or more one-to-one vector associations established between a respective first translation vector and a respective second translation vector, for which an overall value of vector similarity is increased or maximized; and determine the value of the measure of similarity for the specified potential observation pair on a basis of the overall value of vector similarity.

5. The device according to claim 1, wherein the at least one processor is configured to:

determine, for the one or more one-to-one associations from the overall association, one or more respective transformation vectors, by which the second observation in a one-to-one association is transposed to the first observation of the one-to-one association;

determine, on a basis of the one or more respective transformation vectors for the one or more one-to-one associations from the overall association, a uniform transformation vector for the second set of second observations;

transform, respectively, the one or more second observations from the second set of second observations by application of the uniform transformation vector to determine a set of transformed observations;

determine, on a basis of the set of transformed observations, an adapted overall association; and determine the map data with respect to the route portion on the basis of the adapted overall association.

6. The device according to claim 5, wherein the at least one processor is configured to:

determine, using a clustering algorithm, a set of clusters on a basis of the first set of first observations and on a basis of the set of transformed observations; and determine the adapted overall association on the basis of the set of clusters.

7. The device according to claim 1, wherein:

the first set of first observations and the second set of second observations respectively comprise observations of landmarks, each of which represents a landmark type from a plurality of different landmark types;

the plurality of landmark types comprises at least one landmark type which is unsuitable for the determination of the measure of similarity; and wherein the at least one processor is configured to:

determine the values for the measure of similarity only for potential observation pairs of observations which do not include an inappropriate landmark type.

8. The device according to claim 7, wherein the at least one processor is configured to:

determine an adapted overall association, at least in part, by considering one or more observations from the first set of first observations and/or from the second set of second observations which include the landmark type which is unsuitable for the determination of the measure of similarity.

9. The device according to claim 1, wherein the at least one processor is configured to:

determine the map data with respect to the route portion using a Simultaneous Localization and Mapping (SLAM) method, on a basis of the overall association.

10. The device according to claim 1, wherein:

the map data indicates one or more landmarks, including a position of one or more landmarks, on the route portion.

11. The device according to claim 1, wherein:

an observation indicates a position and/or type of a landmark; and/or an observation is made on a basis of sensor data from at least one sensor of the vehicle comprising an environment sensor and/or a position sensor during a trip along the route portion.

12. The device according to claim 1, wherein the at least one processor is configured to:

determine, for a plurality of potential one-to-one associations, respectively, clearance information with respect to a spatial clearance between a first observation and a second observation; and determine the overall association on a basis of the clearance information.

13. The device according to claim 1, wherein the at least one processor is configured to:

determine, for a plurality of potential one-to-one associations, respectively, type information with respect to a first landmark type in the first observation and a second landmark type in the second observation, wherein the type information indicates a similarity of the first landmark type and the second landmark type; and determine the overall association on a basis of the type information.

14. A method for determining map data with respect to a route portion, the method comprising:

acquiring a first set of first observations during a first trip along the route portion, and a second set of second observations during a second trip along the route portion;

determining values of a measure of similarity for a plurality of different potential observation pairs, each consisting of a first observation from the first set and a second observation from the second set, wherein the measure of similarity for each potential observation pair of the plurality of different potential observation pairs comprised of a specified first observation and a specified second observation indicates a similarity between an arrangement of one or more adjacent observations from the first set relative to the specified first observation, and an arrangement of one or more adjacent observations from the second set relative to the specified second observation;

wherein determining the value of the measure of similarity for the at least one potential observation pair, further comprises:

determining a set of first translation vectors from the specified first observation to the one or more adjacent observations in the first set, wherein the specified first observation and the one or more adjacent observations in the first set are all from the first set
of first observations acquired during the first trip;
determining a set of second translation vectors from the
specified second observation to the one or more
adjacent observations in the second set, wherein the
specified second observation and the one or more
adjacent observations in the second set are all from
the second set of second observations acquired dur-
ing the second trip; and
determining the value of the measure of similarity for
the at least one potential observation pair based on a
similarity of a magnitude and/or direction of the set
of first translation vectors and a magnitude and/or
direction of the set of second translation vectors;
determining, on a basis of the values for the measure of
similarity for the plurality of different potential obser-
vation pairs, an overall association between the first set
and the second set comprising one or more one-to-one
associations between, for each one-to-one association,
one particular first observation from the first set and one particular second observation from the second set;
determining map data with respect to the route portion, on
a basis of the overall association; and
performing, by a vehicle, an automated driving function
based at least in part on the map data, wherein the
automated driving function comprises automated con-
trol of at least one of a speed, a braking, or a steering
function of the vehicle.
15. The method according to claim 14, comprising:
determining a vector similarity based on a similarity of
the magnitudes and/or directions of vector pairs from a
first translation vector and a second translation vector
respectively; and
determining the value of the measure of similarity for the
potential observation pair on the basis of the vector
similarity of the one or more vector pairs.
16. The method according to claim 14, comprising:
for the determination of a vector similarity for a specified
potential observation pair, for each potential combina-
tion of a first translation vector from the set of first
translation vectors and a second translation vector from
the set of second translation vectors, determining an
individual value of the vector similarity between a
respective first translation vector and a respective sec-
ond translation vector in each case;

determining, on a basis of individual values for the vector
similarity, a set of one or more one-to-one vector
associations established between a respective first
translation vector and a respective second translation
vector, for which an overall value of vector similarity
is increased or maximized; and
determining the value of the measure of similarity for the
specified potential observation pair on a basis of the
overall value of vector similarity.
17. The method according to claim 14, comprising:
determining, for the one or more one-to-one associations
from the overall association, one or more respective
transformation vectors, by which the second observa-
tion in a one-to-one association is transposed to the first
observation of the one-to-one association;
determining, on a basis of the one or more respective
transformation vectors for the one or more one-to-one
associations from the overall association, a uniform
transformation vector for the second set of second
observations;
transforming, respectively, the one or more second obser-
vations from the second set of second observations by
application of the uniform transformation vector to
determine a set of transformed observations;
determining, on a basis of the set of transformed obser-
vations, an adapted overall association; and
determining the map data with respect to the route portion
on the basis of the adapted overall association.
18. The method according to claim 14, wherein:
the first set of first observations and the second set of
second observations respectively comprise observa-
tions of landmarks, each of which represents a land-
mark type from a plurality of different landmark types;
and
the plurality of landmark types comprises at least one
landmark type which is unsuitable for the determina-
tion of the measure of similarity; and
wherein the method further comprises:
determining the values for the measure of similarity
only for potential observation pairs of observations
which do not include an inappropriate landmark
type.

* * * * *